Oct. 12, 1954
M. E. OLSON
2,691,313
ADJUSTABLE WELDING HORN SUPPORT
Filed March 26, 1952
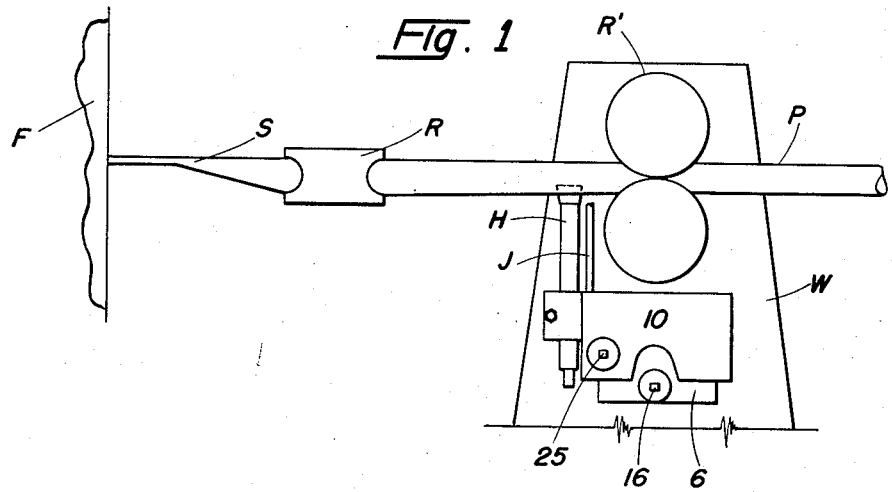
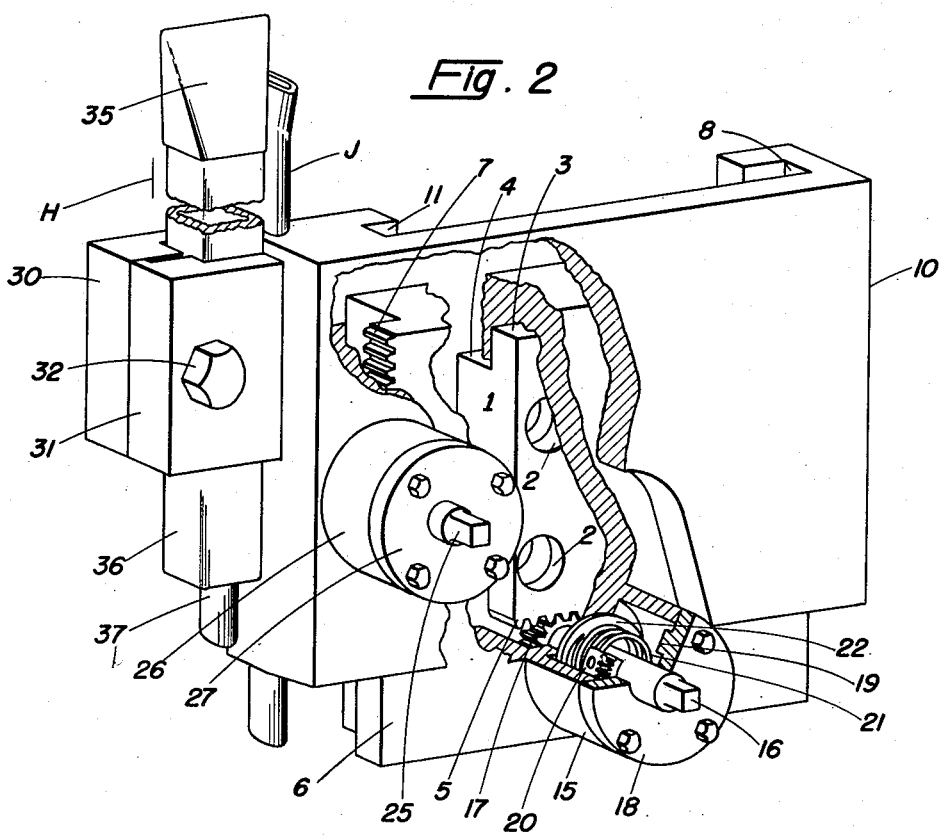
INVENTOR
MERTON E. OLSON
BY
ATTORNEY

Patented Oct. 12, 1954

2,691,313

UNITED STATES PATENT OFFICE 2,691,313

ADJUSTABLE WELDING HORN SUPPORT

Merton E. Olson, Dyer, Ind.

Application March 26, 1952, Serial No. 278,530

2 Claims. (Cl. 78—87)

This invention relates to the production of continuous butt weld pipe and tubes, hereinafter generically termed pipe, and is directed to the provision of novel means for adjustably supporting that element of the pipe mill over which the formed-up skelp is passed prior to the welding together of its edges.

In the manufacture of such pipe the flat heated skelp progressively passes from the heating furnace to a stand of forming rolls which reduce it to substantially circular cross section with its juxtaposed edges in slightly spaced relation and it then passes to the stand of welding rolls. To prevent axial rotation of the formed skelp, to properly guide it into the welding rolls and to some extent to remove scale from the edges a wedge shaped element known as the "horn" is positioned in advance of the welding rolls in such manner that its extremity will extend up between the skelp edges for an appreciable distance, one type of horn which has been utilized to a considerable extent being disclosed in U. S. Patent 2,009,476, issued July 30, 1935, to George T. Church et al. The present invention constitutes an improvement over the aforesaid horn and method of mounting it, in that among other things, it enables the horn to be selectively adjusted both horizontally and vertically with respect to the path of the skelp while maintaining the extremity of the horn tip parallel to that path or, in other words, while maintaining the vertical axis of the horn tip and its supporting shank normal to the path of the skelp at all times. This is impossible with the horn and mounting of the type disclosed in said patent in which vertical adjustment of the horn tip necessarily changes its angular relation to said path and its distance from the plane containing the roll axes. Since adjustment of the position of the horn is frequently required during production of pipe because of change in operating conditions or other reasons and as it is extremely desirable that the upper edge of the horn tip be at all times maintained substantially horizontal and at a proper distance from said plane to produce the best possible weld, my invention marks a distinct advance in the art as exemplified by the disclosure of the said patent; it moreover enables the use of a horn of less expensive construction and facilitates positioning of the jet, through which a blast of oxygen is directed on the skelp edges to raise them to welding heat, in proper relation to the horn.

It is therefore a principal object of my invention to provide supporting means for the welding horn customarily used in the production of continuous butt weld pipe through the medium of which the position of the horn with relation to the path of the skelp can be readily adjusted within limits both horizontally and vertically without disturbing the normal angular relation of the horn tip to that path or its distance from the vertical plane in which lie the axes of the welding rolls.

Further objects comprise the provision of adjustable horn supporting means which can be readily incorporated in existing continuous butt welding apparatus without the necessity for material structural changes therein and which enable the use of a horn of inexpensive construction and the use of an oxygen jet independent of the horn proper and not forming a component thereof, as well as other objects and novel features of design, construction and arrangement hereinafter more particularly mentioned and which will be apparent to those familiar with the art as the description proceeds.

In the accompanying drawing illustrating one embodiment of the invention,

Fig. 1 is a diagrammatic side elevation of the principal parts of a continuous butt weld pipe mill showing my horn supporting means operatively attached to the housing of the welding roll stand, and Fig. 2 is a perspective view of said horn supporting means and associated horn and oxygen jet removed from the mill housing, certain of the elements in this figure being broken away fragmentarily to better show internal construction.

Initially brief reference to Fig. 1 will assist in a ready comprehension of the invention and it will thus be understood from said figure that the flat skelp S after being heated to proper temperature in the furnace F emerges therefrom progressively and passes to forming rolls R whose axes are positioned vertically and thence to welding rolls R' which are supported from the housing W, the housing supporting the forming rolls not being shown. The forming rolls convert the flat skelp to substantially circular cross section though leaving its juxtaposed edges in slightly spaced relation so that the horn, generally designated H and hereinafter more fully described, which is positioned somewhat in advance of the welding rolls enters the seam as indicated to properly guide the skelp to the welding rolls from which it emerges as a finished pipe P, the oxygen jet J located adjacent the horn and preferably between it and the rolls being adapted to project a stream of oxygen on the edges to raise them to welding temperature. It will be noted that in accordance with my invention the horn extends substantially normal to the path of the skelp, this condition obtaining as above mentioned irrespective of any position of adjustment to which the horn may be brought with relation thereto.

Referring now to Fig. 2 the horn supporting and adjusting means of my invention as shown therein comprises a rack plate 1 adapted to be fixedly secured to the welding roll stand housing by screws or bolts extending through countersunk holes 2 in the plate. It is provided at its upper edge with an upstanding guide rib 3 extending partially across the width of the plate and thereby forming a shoulder or way 4 adjacent the inner face of the plate, the latter at its lower edge carrying a series of teeth forming a rack 5, the plate being so secured to the housing that shoulder 4 and upper face of the rib 3 will extend horizontally.

A slide 6 overlies the rack plate and is provided with a groove for reception of the rib 3 and a face seating on the shoulder 4 so that in reality the slide hangs upon rack plate 1 and is capable of horizontal movement in either direction with respect thereto. At its left hand end when viewed as in Fig. 2, which for convenience I shall term its forward end, the slide is provided with an outwardly extending vertical rib having teeth on its extremity forming a rack 7 and its opposite or rear end with a similar rib or extension (not shown) devoid of teeth which is received in a corresponding groove 8 in the adjacent portion of the horn bracket 10 now to be described.

This bracket substantially overlies the slide 6; is provided with the groove 8 just mentioned for reception of the guide rib on the adjacent part of the slide and with another groove 11 receiving the rib on which the rack 7 is formed, and it is thus apparent that the bracket 10 can move vertically on the slide 6 in a manner generally similar to that in which the slide can move horizontally on the rack plate 1.

Means are provided for moving slide 6 and bracket 10 horizontally at a unit relatively to the rack plate and substantially similar means for moving the bracket vertically relatively to the slide and rack plate; a description of one of said means will therefore suffice for the other. Thus for moving the bracket and slide horizontally the former is provided with an outwardly projecting hollow boss 15 having a transversely extending web in its inner end which forms one bearing for a shaft 16 carrying at its corresponding end a preferably integral pinion 17 which meshes with the rack 5, the outer end of the boss being closed by a removable cover 18 forming another bearing for the shaft which latter is squared at its outer end for the reception of a wrench or other suitable tool for turning the shaft; to facilitate assembly the rear face of the slide is desirably bored out or cut away so that the shaft and pinion can be passed outwardly through the boss. The inner face of the cover 18 carries an annular series of teeth 19 for cooperation with a similar series of teeth on a clutch collar 20 pinned on the shaft while a coil spring 21 between this collar and a washer 22 seating against the web biases the shaft outwardly so as to normally maintain the teeth on the collar in engagement with teeth 19 thus locking the shaft against rotation. It will be apparent, however, that by placing a wrench on the outer end of the shaft and forcing the latter inwardly the clutch teeth can be disengaged to permit the shaft to be turned whereby through cooperation of the pinion with the rack 5 to move the slide 6 and bracket 10 horizontally in either direction for a limited distance.

The means for moving the bracket 10 vertically relatively to the slide and rack plate comprise in a generally similar way a shaft 25, having a squared outer end, extended through a boss 26 on the bracket and carrying at its inner end a pinion (not shown) engaging rack 7 on slide 6 with clutch means and clutch biasing means arranged within the boss as just described in connection with shaft 16 so that the shaft 26 is normally locked against rotation but can be unlocked by pressing it inwardly preparatory to turning it to thereby cause its pinion to move the rack 7 and hence the bracket.

The bracket 10 at one end is provided with an extension 30 having a vertical groove adapted to receive substantially one half of the shank of the horn, a clamp plate 31 similarly grooved to receive substantially its other half and removably connected to the extension by a bolt 32 serving when the bolt is set up to hold the shank in any desired position of vertical adjustment.

The horn tip 35 is, as shown, wedge shaped for entrance between the juxtaposed edges of the formed-up skelp and is preferably made of copper and suitably secured to its hollow shank 36, desirably of substantially square section, and provided at its lower end with an inlet connection 37 for attachment of a flexible hose by which water or other coolant is directed into the horn, the copper of course being a good conductor of heat.

The oxygen jet J, conveniently a pipe with its upper end somewhat flattened, is supported adjacent the horn substantially as shown, preferably by extending the pipe through a suitable hole in the bracket 10 with a set screw (not shown) in the bracket bearing on the pipe to hold the latter in any position of vertical adjustment; in operation a flexible hose is connected to the lower end of the pipe to supply the necessary oxygen.

It will now be apparent that when my adjustable horn supporting means are secured to the housing of the welding rolls (Fig. 1) or other convenient support in such way as to bring the tip of the horn into vertical alignment with the groove in the skelp as it passes to the said rolls, and the horn and oxygen jet adjusted roughly to their approximate operative positions and secured therein, the end of the horn tip will parallel the line of travel of the skelp and will remain in that position when the horn is adjusted vertically by manipulation of shaft 25 or horizontally by manipulation of shaft 16 in the manner already described; when making either of these adjustments it is unnecessary to shut down the pipe mill which is a matter of great advantage.

In any position of adjustment the horn is held firmly against vibration, the skelp always rides fully across the width of the side faces of the horn tip and so is supported thereby to the maximum extent and prevented from turning; the skelp in consequence enters the welding rolls without wavering and without any twisting with resulting maximum quality in the weld.

Although I have herein described one form of my invention with considerable particularity I do not thereby desire or intend to restrict myself specifically thereto as, if desired, changes and modifications may be made in the various instrumentalities employed and in their method of assembly and inter-action without departing from the spirit and scope of the invention as defined in the appended claims.

Having thus described my invention, I claim and desire to protect by Letters Patent of the United States:

1. Adjustable welding horn supporting means comprising a rack plate adapted for securement in a fixed position, a rack on one edge of the plate, a slide associated with the plate for movement relatively thereto in a direction parallel to said rack, a rack on one edge of the slide, a bracket comprising means adapted to receive the horn associated with the slide for movement relatively thereto in a direction normal to the rack on the plate, a shaft carried by the slide, a pinion on the shaft engageable with that rack, a shaft carried by the bracket, a pinion on said shaft engageable with the rack on the slide, rotation of the first shaft being operative to cause unitary movement of the slide and bracket parallel to the rack on the plate and rotation of the second shaft being operative to cause movement of the bracket relatively to the slide and plate in a direction normal to the rack on the latter and releasable locking means associated with each shaft for restraining rotation thereof.

2. Apparatus as specified in claim 1 wherein said locking means comprise releasable clutch means associated with each shaft each including a fixed element and an element carried by the shaft and rotatable therewith operative when in interlocking engagement with the fixed element to lock its associated shaft in any position of rotational adjustment and releasable from such engagement on longitudinal movement of the shaft preparatory to rotation thereof.

References Cited in the file of this patent

UNITED STATES PATENTS

| Number | Name | Date |
| --- | --- | --- |
| 2,009,476 | Church et al. | July 30, 1935 |
| 2,196,106 | Darner | Apr. 2, 1940 |
| 2,339,403 | Hess | Jan. 18, 1944 |